United States Patent
Gupta et al.

(10) Patent No.: US 11,566,598 B2
(45) Date of Patent: Jan. 31, 2023

(54) WIND TURBINE DESIGN METHOD

(71) Applicant: VESTAS WIND SYSTEMS A/S, Aarhus N (DK)

(72) Inventors: Mranal Gupta, Tilst (DK); Alf Søe-Knudsen, Sabro (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 285 days.

(21) Appl. No.: 16/959,129

(22) PCT Filed: Dec. 14, 2018

(86) PCT No.: PCT/DK2018/050362
§ 371 (c)(1),
(2) Date: Jun. 29, 2020

(87) PCT Pub. No.: WO2019/129330
PCT Pub. Date: Jul. 4, 2019

(65) Prior Publication Data
US 2020/0332770 A1    Oct. 22, 2020

(30) Foreign Application Priority Data
Dec. 29, 2017 (DK) .......................... PA 2017 71033

(51) Int. Cl.
*F03D 1/00* (2006.01)
*F03D 7/02* (2006.01)

(52) U.S. Cl.
CPC .............. *F03D 1/00* (2013.01); *F03D 7/0296* (2013.01); *F05B 2260/84* (2013.01); *F05B 2260/964* (2013.01)

(58) Field of Classification Search
CPC ...... F03D 1/00; F03D 7/0296; F05B 2260/84; F05B 2260/964; F05B 2260/96; Y02E 10/72
See application file for complete search history.

(56) References Cited

U.S. PATENT DOCUMENTS 5,010,576 A * 4/1991 Hill ................. G10K 11/17823
381/71.14
5,410,607 A * 4/1995 Mason ............. G10K 11/17873
381/71.2

(Continued)

FOREIGN PATENT DOCUMENTS

EP    1170681 A2    1/2002
EP    2644886 A2    10/2013

(Continued)

OTHER PUBLICATIONS

Siemens Technical Info, Siemens PLM Software, "What is transfer path analysis." dated Dec. 31, 2014, pp. 1-6.

(Continued)

*Primary Examiner* — Pedro J Cuevas
(74) *Attorney, Agent, or Firm* — Patterson + Sheridan, LLP

(57) ABSTRACT

A radiating component of the wind turbine is modelled as a plurality of elements, wherein each element represents a physical portion of the radiating component and at least a portion of each of the elements are acoustically coupled to one or more of the other elements. A simulation of a vibrational source located within the wind turbine is applied at an interface of the modelled radiating component. A transfer function is used to determine the transmission of vibrations from an interface with the vibrational source to the elements. Tonal noise radiated from the elements to an environment external to the wind turbine is determined based upon the transmission of vibrations from the interface through the elements. The design of the radiating component, or of a component between the radiating component and the vibrational source, is modified to reduce the tonal noise radiated from the radiating component.

22 Claims, 7 Drawing Sheets

(56) References Cited

U.S. PATENT DOCUMENTS

| | | | | |
|---|---|---|---|---|
| 8,155,332 | B2* | 4/2012 | Gross | G10K 11/17823 |
| | | | | 381/71.5 |
| 8,800,736 | B2* | 8/2014 | Kashani | F16F 15/0275 |
| | | | | 267/136 |
| 11,125,210 | B2* | 9/2021 | Gupta | F03D 7/0224 |
| 11,255,310 | B2* | 2/2022 | Gupta | F03D 7/02 |
| 11,286,909 | B2* | 3/2022 | Gupta | F03D 7/0296 |
| 2004/0093195 | A1 | 5/2004 | Goto et al. | |
| 2004/0243332 | A1 | 12/2004 | Shen et al. | |
| 2007/0031237 | A1* | 2/2007 | Bonnet | F03D 7/048 |
| | | | | 415/1 |
| 2008/0164091 | A1* | 7/2008 | Kerber | F03D 7/0296 |
| | | | | 181/296 |
| 2010/0133818 | A1* | 6/2010 | Kinzie | F03D 7/0296 |
| | | | | 290/44 |
| 2010/0135798 | A1* | 6/2010 | Eggleston | F03D 7/0296 |
| | | | | 416/31 |
| 2010/0143119 | A1* | 6/2010 | Kooijman | F03D 7/0224 |
| | | | | 416/31 |
| 2010/0299107 | A1 | 11/2010 | Umayahara et al. | |
| 2016/0032894 | A1 | 2/2016 | Ambekar et al. | |
| 2019/0203694 | A1* | 7/2019 | Gupta | F03D 7/0296 |
| 2019/0271295 | A1* | 9/2019 | Gupta | F03D 7/0276 |
| 2020/0182224 | A1* | 6/2020 | Gupta | F03D 17/00 |
| 2020/0318611 | A1* | 10/2020 | Gupta | F03D 7/0224 |
| 2020/0332767 | A1* | 10/2020 | Gupta | F03D 17/00 |

FOREIGN PATENT DOCUMENTS

| | | |
|---|---|---|
| EP | 3211218 A1 | 8/2017 |
| WO | 2017092773 A1 | 6/2017 |
| WO | 2019129330 A1 | 7/2019 |

OTHER PUBLICATIONS

Danish Patent and Trademark Office, Search Report—Patent, Application: PA 2017 71033, dated: Jul. 6, 2018.

Danish Patent and Trademark Office, 1st Technical Examination of Patent Application PA2017 71033, dated Jul. 6, 2018.

PCT: Written Opinion of the International Searching Authority, Application: PCT/DK2018/050362, dated Jul. 6, 2018.

PCT: International Search Report, Application: PCT/DK2018/050362, dated Jul. 6, 2018.

Stauber et al., "Tonal Noise Mitigation on Wind Turbines", 24th International Congress on Sound and Vibration (ICSV24), Jul. 23-27, 2017.

Goris et al., "A validated virtual proototyping approach for avoiding wind turbine tonality", 5th International Conference on Wind Turbine Noise, Denver, Colorado, USA, Aug. 28-30, 2013.

Predica et al., "Innovative CAE/Testing Solutions for Wind Turbines", 20th European Concurrent Engineering Conference 2014, ECEC 2014—10th Future Business Technology Conference, FUBUTEC 2014.

Siemens Techical Info: What is transfer parth analysis, 2014.

European Patent Office, Communication of a notice of opposition for European Patent Application No. 18826944.3, dated Dec. 8, 2022.

* cited by examiner

WIND TURBINE DESIGN METHOD

TECHNICAL FIELD

The application relates to a method for designing or modifying wind turbines and wind turbine components, particularly to reduce turbine tonal noise emission by determining the source, path and transmission of tonal noise on or in the components of a wind turbine.

BACKGROUND ART

FIG. 1 illustrates a wind turbine 1 known in the art, comprising a tapered tower 2, which is subdivided into a number of tower sections 6. A wind turbine nacelle 3 is positioned on top of the tower 2. The wind turbine rotor 4, comprising a number of wind turbine blades 5, is connected to the nacelle 3 through the low speed shaft which extends out of the nacelle 3 front.

Typically a tower section 6 comprises a number of tower rings welded together during the making of the section 6, where each section typically at each end comprises a connection flange for connecting the tower sections 6 to each other at the site to form a complete tower 2. The tower sections 6 can theoretically be up to more than 50 or 60 meters long but in practice they are seldom more than 35 meters long so that they can be transported on existing road systems.

In this example the tower 2 comprises a top section 12 on top of five other tower sections 6, but the tower 2 could comprise more or fewer tower sections 6 depending on the total height of the tower 2, the type of wind turbine 1, the weight of the nacelle 3 and rotor 4, the maximum transportable length, or other factors.

FIG. 2 illustrates a simplified cross section of a nacelle 3 of a typical wind turbine 1, as seen from the side. Nacelles 3 exist in a multitude of variations and configurations but in most cases the drive train in the nacelle 3 comprises one or more of the following components: a gearbox 15, a coupling (not shown), some sort of breaking system 16 and a generator 17. A nacelle 3 of a modern wind turbine 1 can also include a converter 18 (also called an inverter) and additional peripheral equipment such as further power handling equipment, control cabinets, hydraulic systems, cooling systems and more.

The weight of the entire nacelle 3 including the nacelle components 15, 16, 17, 18 is carried by a nacelle structure 19, sometimes referred to as a base-plate. The components 15, 16, 17, 18 are usually placed on and/or connected to this common load carrying nacelle structure 19. In this simplified embodiment the load carrying nacelle structure 19 only extends along the bottom of the nacelle 3 e.g. in form of a bed frame to which some or all the components 15, 16, 17, 18 are connected. In another embodiment the load carrying structure 19 could comprise a gear bell which, through the main bearing, could transfer the load of the rotor 4 to the tower 2, or the load carrying structure 19 could comprise several interconnected parts such as latticework.

At the bottom of the nacelle 3 the wind turbine 1 may be provided with a yaw mechanism 14 fitted in the joint between the tower 2 and the nacelle 3. The yaw mechanism 14 could comprise some kind of toothed slewing bearing actuated by some kind of motor driven pinion.

A wind turbine known in the art comprises a tapered wind turbine tower and a wind turbine nacelle positioned on top of the tower. A rotor with a number of blades is connected to the nacelle through a low speed shaft, which extends out of the nacelle front as illustrated on FIG. 1.

Noise emission from wind turbines is a well-known problem and has been the subject of extensive work. The procedure for measuring wind turbine acoustic noise is described in the third edition of international standard IEC 61400-11. Noise emission can be a serious problem, in particular for land based turbines. The more noise the operating wind turbine generates the more remotely it has to be sited from homes and population centres.

The noise emission from a wind turbine includes both mechanical noise and aerodynamic noise. Mechanical noise includes noise driven by components within the nacelle, such as the wind turbine drivetrain. Such noise can be radiated to the surroundings directly from the surface of vibrating components (so-called airborne noise) or can be radiated to the surroundings by the wind turbine tower or blades when vibrations of components are conducted through the structure of the wind turbine (so-called structure borne noise (SBN)). Aerodynamic noise comes from the wind turbine blades and includes, for example, noise due to vortex-shedding.

A major source of noise, therefore, can be vibration e.g. from gears meshing in the gearbox spreading as structure borne vibrations which can end up generating vibrations in other parts of the wind turbine. Noise is then radiated from surfaces of these other parts as a function of the vibration level on the surface, and the noise radiation ability of the same surface. Any resonances in the structure will further amplify the vibration transmission. Another major noise source would be other mechanical vibration inducing equipment in the nacelle such as the generator, pumps for cooling or hydraulic systems, motors etc.

PCT patent application WO 2009/080028 describes the provision of noise reducing means for reducing noise emission from the turbine tower. The noise reducing means comprises a beam formed as an elongated strengthening member and one or more damping means, where the damping means are arranged between the tower wall and the beam, the damping means is arranged so that relative movement between the tower wall and the beam result in dissipation of energy via the damping means in order to reduce noise emission. In wind turbine towers, where weight is a big issue, it is advantageous to reduce noise emission by way of damping means arranged so that they are able to dissipate the energy of the noise inducing oscillations, in that this provides for a more efficient noise reduction at a much lower weight. Placing the damping means between the tower wall and a rigid beam ensures that the oscillations in the tower wall will entail a deformation of the damping means, hence at least some of the energy is transformed to heat due to internal friction or hysteresis in the damping means and a damping and noise reducing effect is achieved.

The spectrum of noise produced by a wind turbine includes both broadband noise and noise at distinct frequencies. Noise at distinct frequencies, known as tonal noise, is often perceived as more annoying to wind turbine neighbours and is more likely to be the subject of noise complaints. Unfortunately, it is difficult to predict when a wind turbine will produce tonal noise and when tonal noise will be audible to wind turbine neighbours, as this can depend on a wide variety of factors.

There has been extensive work in attempting to reduce noise emitted from wind turbines. This includes tackling both aerodynamic and mechanical noise. As a result of this work, wind turbines generally emit less noise.

However, due to its unpredictability, it has been difficult to effectively reduce tonal noise. Even on relatively quiet wind turbines, the problem of tonal noise emission is still apparent and is often exaggerated due to the reduction in broadband noise. It can also be challenging, expensive and sometimes impossible to retrofit towers to reduce tonal noise emissions.

It has therefore been appreciated that it would be desirable to effectively reduce or manage tonal noise using wind turbine design modification techniques.

SUMMARY OF THE INVENTION

The invention is defined in the independent claims to which reference should now be made. Advantageous features are set out in the dependent claims.

A method for determining a wind turbine component design is provided. A radiating component of the wind turbine is modelled as a plurality of elements, for example by finite element analysis/modelling, wherein each element represents a physical portion of the radiating component of the wind turbine and at least a portion of each of the elements are acoustically coupled to one or more of the other elements. A simulation of a vibrational source located within the wind turbine is applied at an interface of the modelled radiating component. A transfer function is used to determine the transmission of vibrations from an interface with the vibrational source to the elements. Tonal noise radiated from the plurality of elements to an environment external to the wind turbine is determined based upon the transmission of vibrations from the interface through the elements. The design of the radiating component of the wind turbine, or of a component between the radiating component and the vibrational source, is modified to reduce the tonal noise radiated from the radiating component.

Optionally, determining the tonal noise radiated from the plurality of elements to an environment external to the wind turbine comprises determining the vibrations transmitted to elements located at an interface between the radiating component and the environment external to the wind turbine. This may refer, in particular, to the tower/air interface or the blade/air interface.

Optionally the method further includes applying a filter to the elements, wherein the filter identifies a group of the elements that do not substantially acoustically couple, directly or indirectly, with elements that are located at the interface between the radiating component and the environment external to the wind turbine, and the method further includes removing said group of elements from the step of determining the tonal noise radiated to the environment external to the wind turbine.

Optionally the method further includes the step of determining a vibrational transfer path through the elements taken by vibrations having a frequency that corresponds to tonal noise during transfer of the vibrations from the source interface to the plurality of elements. The method may then further include the step of using the vibrational transfer path to identify a position in the vibrational transfer path where one or more properties of the wind turbine radiating component may be modified to reduce the vibrational transfer from the source interface to the plurality of elements that are located at an interface between the radiating component and the environment external to the wind turbine, the position being determined based upon the position of elements in the vibrational transfer path. The method may then further include the step of outputting an indication of the position where the radiating component may be modified.

Optionally, the method further comprises modifying the design of the radiating component, or another component in the path of the transmission of vibrations by doing at least one of:

changing the thickness of a portion of the component, particularly increasing thickness such as the thickness of the tower wall or the blade wall;

adding a mechanical stiffener to the component, particularly adding the stiffener within the radiating component;

adding a vibrational dampener to the component; and adding an acoustic shield to the component, particularly adding the acoustic shield to the external surface of the radiating component.

Optionally, particular modifications to the design may include positioning a vibrational dampener between two mechanical stiffeners, or between a mechanical stiffener and the interface to the vibrational source. Optionally the vibrational dampener comprises a plurality of damping elements placed between an outer structure and an inner structure, the damping elements connecting the outer structure and inner structure together. The damping elements may be comprised of a resilient material, and/or the damping elements are actuators configured to be driven at a desired frequency.

Optionally, the characteristics of the simulation of the vibrational source are predetermined, the characteristics including frequency and amplitude of vibrations of the vibrational source.

Optionally, the radiating component is the wind turbine tower. The interface of the modelled radiating component with the vibrational source may then be the interface between the tower and the nacelle base-plate.

Optionally, the radiating component is a blade of the wind turbine. The interface of the modelled radiating component with the vibrational source may then be the interface between the hub and the blade root.

Optionally the vibrational source is the drivetrain of the wind turbine. The vibrational source may, in particular, be a gearbox.

Optionally the modification to the design is made at or near a position corresponding to an anti-node of a mode of vibration of the radiating component that is determined to couple with the transmitted vibrations.

A corresponding computer program may be provided for carrying out any aspects of the method described herein.

By implementing embodiments of the invention the requirement specification between different turbine systems can be balanced resulting in a more cost effective turbine, fulfilling the turbine requirement specification with reduced tonal noise emission from the turbine component (e.g. tower/blade).

Site specific towers/blades could also be designed based on the local requirements on tonality. There can be design guidelines for various turbine components governing critical sections for wave transmission/radiation/acoustic coupling which can then govern the design of tower; blade. It can also enable definition of dimensional tolerances for critical component sections.

This can lead to early evaluation of turbine concepts and any needed design changes (including even a different gear ratio or type of meshing, as examples, to avoid particular types of excitations at critical frequencies) or modifications or mitigations, enabling better system integration.

The analysis described can lead to a more accurate and optimal solution for each design. The techniques described allow optimization of stiffness, mass and damping distribution in the design (for cost and practicality) such that it is known what level of these modifiers are needed, how much and where. This is possible as loads, or excitations, and component design can be considered at all stages of development. This also allows for space allocation for retrofitting a mitigation feature where it is calculated that it might be needed.

BRIEF DESCRIPTION OF THE DRAWINGS

One or more embodiments of the invention will now be described with reference to the following figures in which.

DETAILED DESCRIPTION OF THE PREFERRED EMBODIMENTS

Generally, according to embodiments, wind turbine radiating components that are known to be major radiators of structure borne noise, such as blades and towers, are designed to reduce tonal noise emission. The modifications are carried out on certain sections of the component. The modifications may be carried out by, for example, altering one or more of stiffness, mass and damping as applied to the component. The modifications may be made at the design stage, testing stage, construction stage or as a retrofit to turbines in the field.

The method employed analyses the vibro-acoustic state between a vibrational source and a noise radiator. Loads, or excitations, from a wind turbine drive train are transformed to loads at suspected critical noise radiators. A suspected radiator's capability of generating noise based on a given loading is determined. In addition, it is possible to examine how vibrational energy flows through the structure from excitation to identified critical radiators. Transfer functions through load carrying structures may be used. In addition, radiation efficiency may be included as a factor and/or energy flux analysis may be applied.

Figure 1:
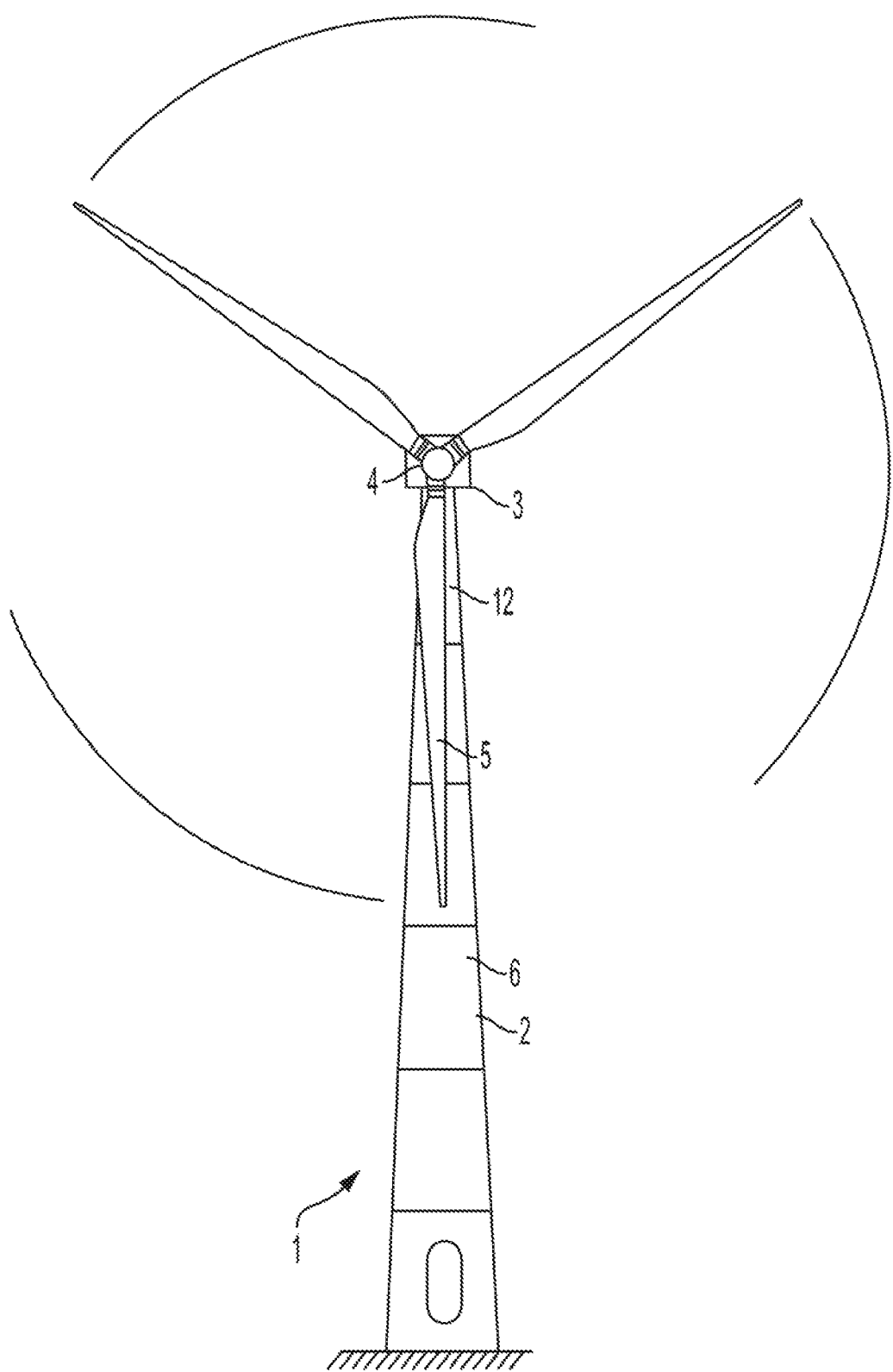
FIG. 1 illustrates a large modern wind turbine known in the art, as seen from the front.
Figure 2:
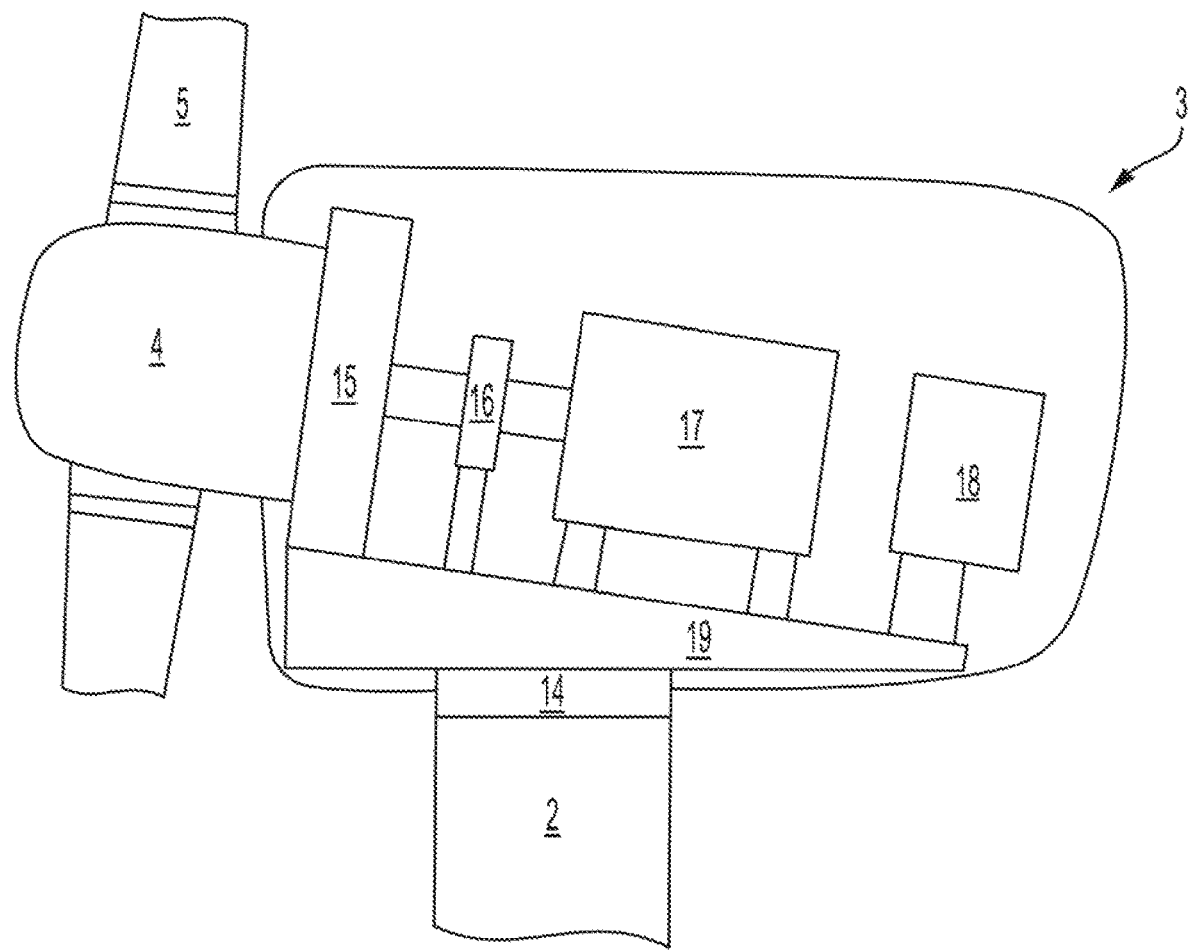
FIG. 2 illustrates a simplified cross section of a nacelle, as seen from the side.
Figure 3A:
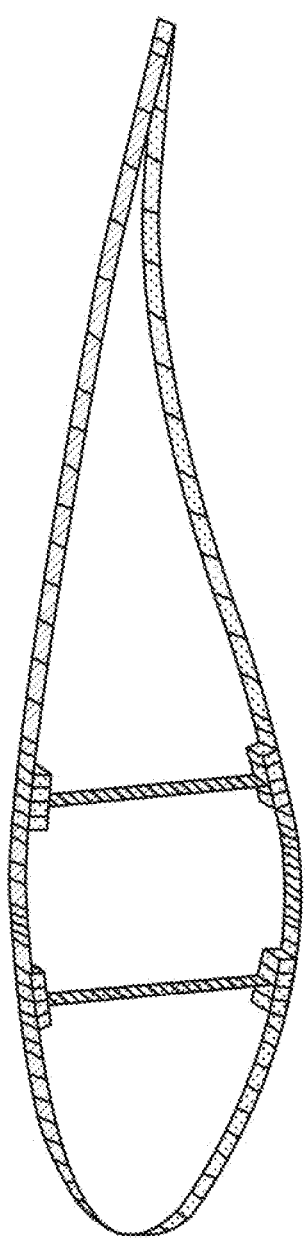
FIG. 3A shows an example of a portion of a wind turbine blade modelled as a set of vibrating elements.
Figure 3B:
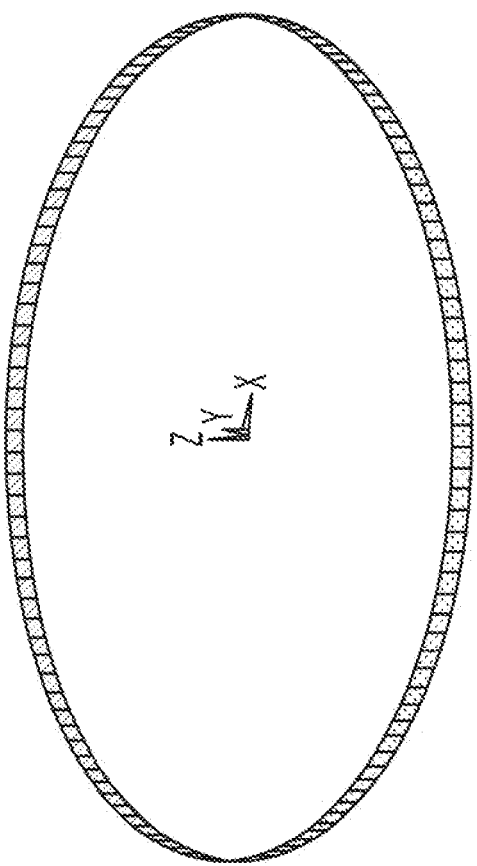
FIG. 3B shows an example of a portion of a wind turbine tower modelled as a set of vibrating elements.

Initially a radiating component of the wind turbine is modelled as a plurality of elements, wherein each element represents a physical portion of the radiating component of the wind turbine and at least a portion of each of the elements are acoustically coupled to one or more of the other elements. In particular, the turbine tonal noise radiating component under test is modelled as a particular shape. The shape (e.g. that of a blade or tower) may be modelled as a collection of spectral elements that function as simulated noise radiators. The shape may be constructed from a set of slices, or rings. FIGS. 3A and 3B show examples of suitable slices for a blade (FIG. 3A) and a tower (FIG. 3B) respectively. The radiating component may have a specific length, or may be modelled as a semi or infinitely long shape. Suitable boundary conditions are applied.

For the avoidance of doubt, the blade shown in FIG. 3A is only an example, and other constructions are possible. The blade may have more or fewer webs, and may include a spar cross section.

An appropriate model may be a finite element analysis model, which may be generally produced by importing a CAD model of the structure into finite element analysis meshing software, which is then used to discretize the structure into a number of elements connected through discrete nodal points, as known in the art. Elements representing sections of beams, shells or solids are generally available. The mechanical properties of each element can be used to construct mass, stiffness and/or damping matrices representing the complete system.

During simulation, the shape may optionally be "opened" up to form a linear shape or open area in order to model vibrations between the elements making up the shape.

A transfer function is used to determine the transmission of vibrations from the interface with the vibrational source to the elements. This may be achieved in various ways. For example, a simulation of a vibrational source located within the wind turbine is applied at an interface of the modelled radiating component. The interface may be comprised of a plurality of spectral elements that are also treated as noise radiators/vibrators. The interface properties will depend upon the nature of the interface. The turbine tower will generally have an interface with a base plate in the nacelle to which the vibration source (e.g. a complete drivetrain, or the gearbox) is coupled. A turbine blade will generally be coupled to the hub.

Examples of a source of tonal noise within a wind turbine is the gearbox or generator parts of the drivetrain. A gearbox, and particularly a wind turbine gearbox which typically comprises one or more epicyclical gear stages, includes a plurality of gears meshing during operation and the impact of the teeth meeting each other can create vibrations, which through the nacelle structure and through the yaw mechanism can spread to the tower wall, where the vibrations can make the tower wall emit noise.

Figure 4B:
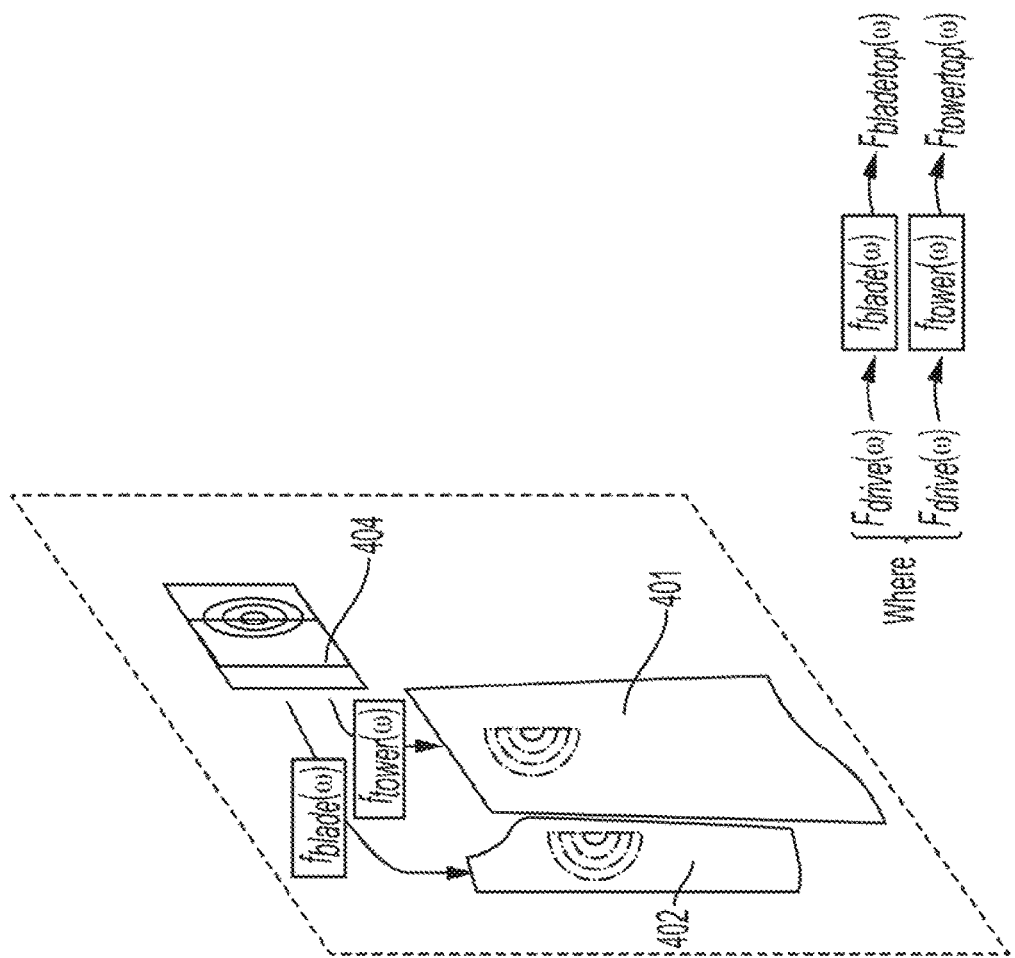
FIG. 4B indicates the components between which vibrations are propagated, in simulation, using transfer functions.
Figure 4A:
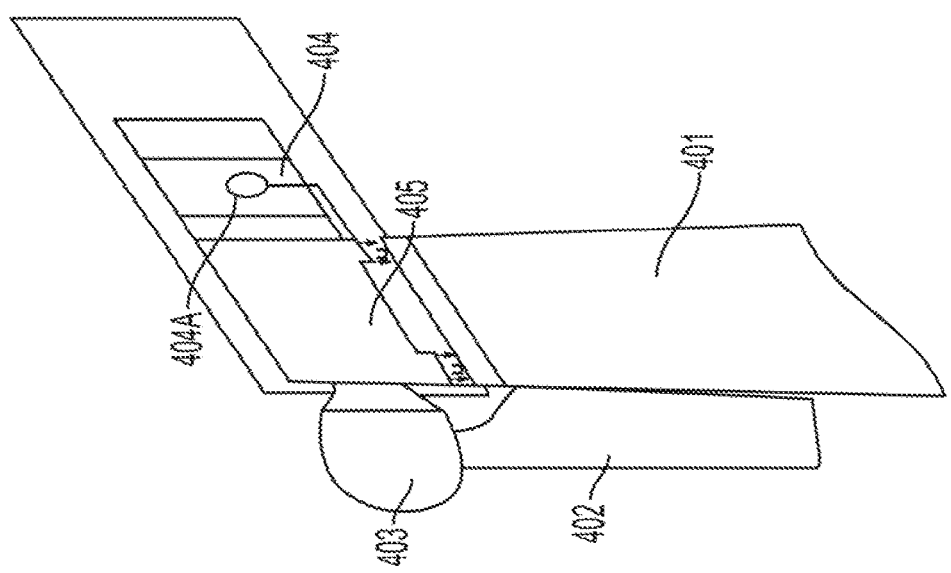
FIG. 4A shows a representational view of the components of a wind turbine through which vibrations may propagate.

FIG. 4A shows a representational view of the components of a wind turbine, with a tower 401, single representative blade 402, hub 403, drivetrain 404 and base plate 405. The drivetrain may include a gearbox 404A, optionally with one or more torque arms connecting the gearbox to a structural component such as the base plate. As shown in FIG. 4B, transfer functions are used to represent the transmission of vibrations from the drivetrain 404 to the interfaces with the radiating components, which in this instance are the tower 401 and blade 402.

The simulation may provide an input load signal. The load signal is indicative of the vibrations output by the vibrational source during turbine operation, and may be indicative of output vibrations under particular operating conditions. A common load signal may be applied to each of the spectral elements at the interface, or a different load signal may be applied, depending upon the properties of the turbine component interfacing with the radiating component and of the interface itself.

Based upon the load signal, the vibrational response of at least a sub-set of each of the spectral elements of the radiating component can be determined and propagated through the structure. This allows a determination of the spectral elements that would be emitting tonal noise.

The elements at the interface, to which the initial input signal is applied, will respond by vibrating according to their pre-established parameters. These elements will be acoustically or vibrationally coupled to one or more neighbouring elements which will, in turn vibrate in response. In this manner, the vibrations of the vibrational source are propagated through the structure to its boundary with the air, from which tonal noise is propagated.

This method allows a relative tonal noise level to be obtained. Different loads can be applied as different inputs, depending upon the vibrational source type and/or the turbine operation parameters. For example, different gearbox types will produce different load signals, as will different turbine operational parameters such as wind speed. These will produce different results for tonal noise output from the radiating component. Alternatively, or in addition, different models for the radiating component can be used, for example different tower or blade design simulations, for the same load signal, will give different results.

It is possible to assume that every spectral element couples acoustically/vibrationally to all neighbouring elements. This provides useful results without detailed analysis being required. Alternatively, further constraints can be placed on the model to restrict coupling to a sub-set of components. This provides a more representative model, and the specific couplings can be determined based upon a more detailed analysis of the model, or based upon measurements made of active turbines for example. Elements that do not couple acoustically through the structure can be filtered from consideration.

One example of modelling the elements comprising the radiating component is to model each spectral element/node as an individual loud speaker. Optionally, the area of each loud speaker is set to be equal to the average of the surrounding elements.

Essentially the mechanical vibration signals from a vibration source are modelled as loads applied to the interface of interest. The "loads" can be considered as any property indicative of how the component elements at the interface will move based upon the vibration source movements. The loads could be, for example, displacement vibration, acceleration, or a transfer of forces. Generally, predefined models are available for load application and radiating component definition. Alternatively, or in combination, measured data from turbines in the field, or in testing, may be used. The loads being applied can be obtained using a software package such as Simpack multi-body simulation software. These loads may be transferred into a format suitable for the simulation software to use. An example of appropriate simulation software includes ANSYS engineering simulation and 3-D design software.

Measured and simulated data may be available for discrete points on the turbine, particularly on the component being modelled. Data for different operational conditions of the turbine (different speeds and torque levels etc.) are also available. This data can be input into the simulation software (again, for example, ANSYS).

Predefined models or software scripts may be used to apply a load at a section of the radiating component. Vibration levels can be converted to force at a measure point. Knowledge of the radiating component properties (such as the stiffness matrix) allow a conversion to be made between force and displacement. An area for each measured point can be assigned, covering the entire radiating component, to determine how each of the elements at the interface will respond.

The tonal noise radiated from the plurality of elements to an environment external to the wind turbine is determined based upon the transmission of vibrations from the interface through the elements.

Various methods may be employed to determine/estimate the resulting noise level for given vibrational inputs. A noise count calculation or a Boundary Element Method (BEM) calculation may be performed for the radiating component (the tower or blade for example) for example. This may be performed for multiple different load cases for a given design for the radiating component. Generally it is determined how the source vibrations transfer from the interface to the component. This may be performed using a dynamic simulation. The simulation indicates how the radiating component will vibrate, and these vibrations can be converted into a value, e.g. from a noise count or BEM calculation, that indicates the noise levels emitted from each part of the radiating component.

The noise count or BEM calculation may provide a mechanism for relative evaluation, and may give an approximate radiation efficiency estimation for each element of the radiating component.

Each of the elements at the interface vibrates in a particular way, as determined by simulation and/or sensor data. The transfer function indicates how these vibrations will couple to all the other elements, either directly or via other elements. Suitable models for simple structures are freely available. Such models take an input and produce a suitable output indicative of induced vibration of the adjoining elements/nodes, which cascades through the structure. From the vibrational input it is therefore possible to determine the level of noise output each of the elements is going to be radiating and in what frequencies. The conversion of vibrational levels to noise may be performed using known techniques; suitable software such as Matlab may be used.

Sound levels in the near field or the far field may be used. Far field noise levels may be determined using a dynamic simulation, assuming each element of the radiating component as a loud speaker and calculating how the noise is transmitting using standard transmission models. For example, when determining acceptable noise levels, the vibrations at the radiating component interface with the external air may be converted into a near field noise level, and the transmission of that near field noise to a far field value at a particular location at a particular distance from the turbine can be determined using appropriate transfer functions. There are various models that can be used to determine noise levels at a given distance from a sound source, such as the Nord2000 model. The transmission can be performed for particular frequencies, so particular tonal noise frequencies can be analysed at desired points in the far field.

The design of the radiating component of the wind turbine may then be modified to reduce the tonal noise radiated from the radiating component as determined by the simulation.

As described herein, tonal noise is reduced by modifying a turbine design, or a constructed turbine which may already be erected in the field. Any appropriate physical property of the radiating component may be modified, but in particular stiffness, mass and/or damping can be modified. This can be done by adding suitable stiffening, damping or mass components to the radiating component, or elsewhere in the vibrational energy transfer path. Based upon the noise output, the radiating component properties can be adjusted for a given load to determine changes to the noise count that result from the simulation. The testing may then be repeated in an iterative process to optimise the radiating component.

One parameter that can be altered is the thickness of the walls of the radiating component. For example, a change in the shell thickness of the tower or the blade, or one or more laminate thicknesses of the blade, could be made. The change may be applied to a model of the turbine, and the method above may be repeated to determine the degree of reduction of noise output over one or more tonal frequency ranges. As described below, it is possible to only change the thicknesses at the areas of the radiating component that are identified by the analysis as contributing to tonal noise, but for the avoidance of doubt, one option is to change the entire tower or blade thickness.

The location of the modifications to the radiating component, or modifications anywhere in the transfer path from the vibrational source, can be specifically determined. This determination may be based upon the vibrational transfer path through the elements taken by vibrations during transfer of the vibrations from the source interface to the plurality of elements. In particular, the vibrations selected for analysis to identify the location are those having a frequency that corresponds to one or more frequency ranges relating to tonal noise. The vibrational transfer path is used to identify a position in the vibrational transfer path where one or more properties of the wind turbine radiating component may be modified to reduce the vibrational transfer from the source interface to the plurality of elements that are located at an interface between the radiating component and the environment external to the wind turbine. This position can be determined based upon the position of elements in the vibrational transfer path. An indication of the position where the radiating component may be modified can be output by the simulation system.

Once the sections radiating noise, and the transfer path, are identified the appropriate and possible changes are identified. These changes may be determined by an algorithm from a pre-stored database or catalogue of potential solutions. The possible changes may then be tried by an optimization algorithm at different locations along the radiating element or along the entire transfer path as appropriate to select the most efficient/optimal solution. The optimal solution may be identified as the one which provides the lowest noise count (or BEM, or any other suitable measure of output tonal noise etc.) or provides the result/value closest to a target value specified in the requirements, which may be specific to the turbine type, particular turbine, or to a particular turbine on a specific site.

As described herein, the modifications may include altering one or more of stiffness, mass and damping in the identified location or locations of the component. Various modifications are possible; for example, a ring stiffener might be sufficient at a particular location, the ring stiffener preventing vibrations of a particular frequency propagating past the point at which it is placed within the component. Further examples are provided below.

Generally, in turbine design, constraints may be placed on the turbine noise emissions. For example, it might be specified that tonal audibility for general wind turbine noise emission, and any subsystem mounted in the wind turbine, as measured according to the procedure as described in the measurement standard (see, for example, IEC 61400-11—third edition), must not exceed a given tonal audibility within a near field measurement position. Other constraints may be applied, for example noise emission of the wind turbine, measured in compliance with the appropriate standard, must not contain any tonal content emitted from the gearbox which exceeds a given tonal audibility.

There could be particular requirements for the various radiating components based upon the various considerations for the component.

Specifying noise levels can complicate the design procedure because changes to the radiating components may reduce general turbine noise, which reduces masking noise and can actually, counterintuitively, increase audibility of tonality. Embodiments of the invention provide a way to improve turbine design because it becomes possible to provide vibrational data based on input to the tower/blade design stage. This information is of more use than simply specifying what the noise level constraints are.

As an optional feature, it is possible to take into account different vibrational modes of the radiating component under consideration. For example, various natural oscillation modes may be excited around one or more of the cross sectional slices of the modelled component (e.g. the slices shown in FIG. 3A or 3B). These "ring" modes, are modes in which the radial distance in the "ring" of the modelled component is varied, as compared with its non-deformed shape, along the circumference. Such modes could be a combination of N number of sine waves along the circumference, for example. Different modes may contribute more or less than others to the transmission of acoustic energy at the tonal frequency of interest. For the avoidance of doubt the term "ring" indicates the general cross sectional shape of the component being modelled. A tower may have a circular cross sectional structure, whereas a blade may be closer to elliptical or some other appropriate loop shape.

Certain vibrational modes may couple acoustically, whereas others will not. The modes that will couple acoustically can be determined based on various information, such as prior simulation and/or measurement of vibrational modes, and/or analysis of acoustic coupling using known techniques. As an example, a determination of the mode or modes that couple acoustically may be based upon a comparison of wavenumber and frequency of the various modes as compared to the wave number of the corresponding frequency in air. Modes having wavenumbers lower than that of sound in air, for a given frequency, could potentially couple at that frequency.

The modifications made to the turbine design can be selected so as to reduce or cancel out the particular mode or modes that couple acoustically, and that are therefore responsible for the transmission of tonal noise. In particular, the positioning of modifying elements may be selected based upon the identified mode or modes that couple acoustically at the tonal frequency or frequencies of interest. Alternatively, or in addition, the manner in which the modifying elements are operated may be adjusted depending upon the particular modes to react to the expected vibrational mode and to reduce or cancel it.

The methodology described above provides information for the design and tuning of interfaces between a given wind turbine component and a radiating component, such as between the hub and blades or between the nacelle bedframe bottom (or base plate) and the tower top. It will now be described how specific modifications can be made based upon the above methodology to reduce tonal noise emissions.

The types of interfaces described above are generally circular (or near circular) and are relatively thin walled. The deflection shape seen on these types of circular interfaces has a large impact on the acoustic radiation from the attached thin walled structure, such as from the blade surface or tower wall. A reduction of the corresponding structural vibrations can be achieved near these interfaces by the introduction of features that modify or control the dynamical response.

As described above, pre-determined solutions may be used to reduce tonal noise output. Features that modify mass, stiffness and/or damping may be applied. Such features could be a stiffening ring or plate. However, more advanced techniques could be applied involving damping and/or active vibrational cancelation. Below three examples are given of how such features could be applied. The examples may be applied in various combinations with each other.

A "stiffening" solution may be applied. Generally a stiffening solution may involve the application of one or more stiffening elements within the blade or tower that extend around the internal boundary or surface of the structure. The stiffening element stiffens a given cross section and thereby acts as a reflector of incoming structural waves. The stiffening element may have a cross section that corresponds to the structure of the radiating element. The stiffening element may be a plate or rim structure. The stiffing element is preferably located within the blade or tower.

Figure 5C:
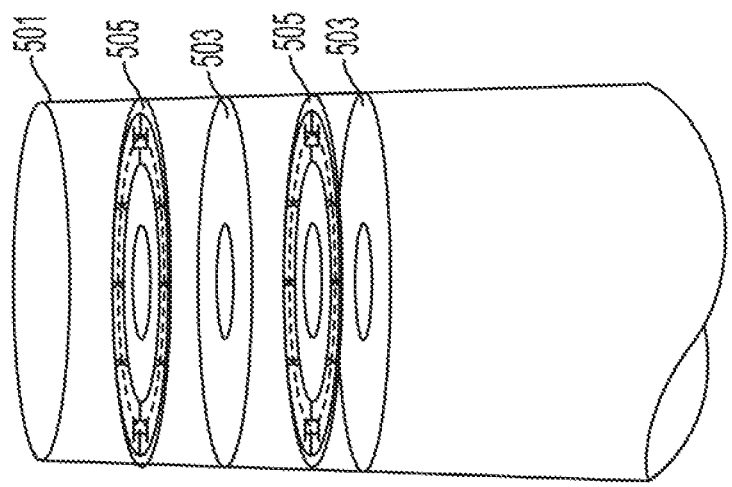
FIG. 5C shows an example of a portion of a turbine tower having damping elements and stiffening elements distributed along the length of the tower.
Figure 5B:
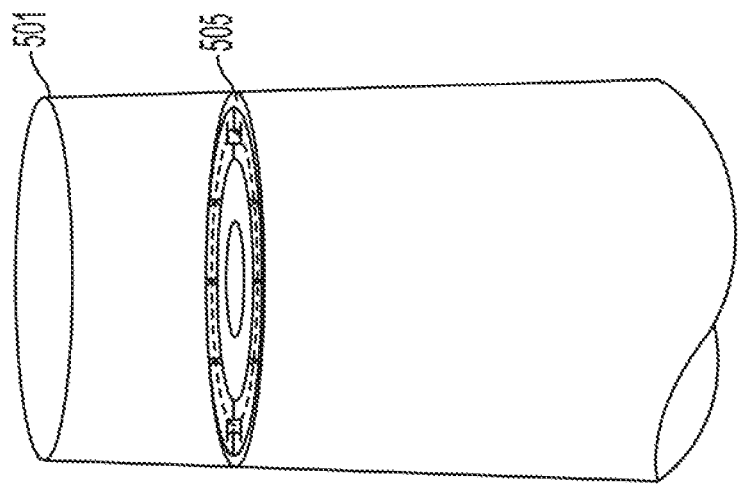
FIG. 5B shows an example of a portion of a turbine tower having a damping element.
Figure 5A:
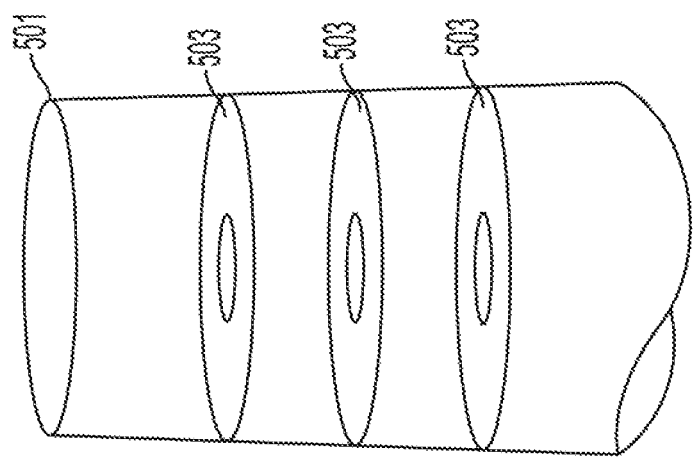
FIG. 5A shows an example of a portion of a turbine tower having a plurality of stiffening elements.

FIG. 5A shows an example of a portion of a turbine tower 501 having a plurality of stiffening elements 503 arranged as a series of stiffening plates located inside the tower.

There can be benefits of placing two or more stiffening elements near the target interface. If the stiffening elements have an appropriate structure and frequency dependent distance (the distance being based on the propagation wavelength) between them then the combination of incoming and reflecting waves would then, at certain frequencies, cancel each other and reduce the vibrations at the interface surface, ultimately resulting in a reduction in emitted noise at that frequency. The suggested modifications may be made in the context of periodic repeated structures. The use of periodic structures in a general context is exemplified in e.g. D. J. Mead, "Wave propagation in continuous periodic structures: research contributions from Southampton, 1964-1995," J. Sound Vib. 190, 495-524 (1996).

A "damping" solution may also, or alternatively, be applied. Generally, damping may be applied at or near to locations of expected anti-nodes of identified vibrational modes that couple acoustically at the tonal vibrational frequency of interest.

By linking points around the perimeter of the interior of the radiating element using a system containing damping material it is possible to dissipate some of the vibrational energy by transforming it into heat.

It is expected that the general shape of the radiating element's cross section may be more complex than a simple ring shape. Due to the expected higher order ring shape, oval or other more complex shapes for the addressed radiating element cross section it is possible to make use of the different phases in displacement around the perimeter of the cross section. As an example, the addressed cross section may refer to the cross section with the hub (for a blade), or the base plate (for the tower), or to the cross section of the radiating element generally, and the perimeter may refer to the perimeter of the interface of the radiating element or to the perimeter of the radiating element generally.

It is possible to link a series of locations, optionally via a central linking point, around the circumference of the cross section and use the difference in radial movement between these locations to provide damping. This may be of particular use where the average radial movement for a given cross section is much smaller than what is seen on the circumference (e.g. when the mode N≠1). It will here be a possibility to link a series of locations at the circumference (optionally via a central linking point) and use the difference in radial movement for damping or active vibration cancelation. A first location may be paired with one or more locations based on the expected vibrations of the mode or modes that couple acoustically with the frequency of tonal noise of interest. The displacements at one or more of the locations counteract the displacements at one or more different locations in order to reduce vibrations associated with the mode or modes of interest. Alternatively, or in addition, active vibration cancelation may be used in the manner described below.

FIG. 5B shows an example of a portion of a turbine tower 501 having a damping element 505. The damping element comprises a plurality of discrete radial damping elements. In this design the damping elements are placed in between the inner tower circumference/perimeter and a centre structure. For example, the damping element may be comprised of an inner and outer ring coupled together by a plurality of resilient elements. The outer ring shape may correspond to the interior perimeter cross section of the tower (or other radiating element such as a blade), The inner ring may have a corresponding shape. The outer and inner rings may be in the form of plates or annular rings. The resilient elements may be formed from springs, or any suitable resilient material such as rubber. Other possibilities to provide damping may include pneumatic, hydraulic, magneto-rheological and piezoelectric elements as appropriate.

This "damping" solution can be combined with the above "stiffening" solution. In particular, one or more damping elements could be positioned alternately with one or more stiffening elements along the length of the radiating element. The damping elements can capture a resonance behaviour between respective stiffening elements, with the damping element converting the amplified vibration motion between the stiffening elements into heat. In particular, a damping element may be positioned between a stiffening element and the interface of the radiating element with the rest of the wind turbine, or it may be positioned between two stiffening elements.

FIG. 5C shows an example of a portion of a turbine tower 501 having two damping elements 505 distributed alternately along the length of the tower and interleaved between two stiffening elements 503. In particular, FIG. 5C provides an example of a combinatorial setup using both stiffening plates and damping plates.

A "ring mode exciter", or "ring mode suppression system" may use a similar arrangement to the damping arrangement, but having actuators taking the place of the damping material. These actuators can be driven at desired frequencies by control circuitry, and allow the generation of an anti-phase ring excitation cancelling the incoming structural wave. To capture shell rotation it would be beneficial to use at least two ring mode exciters positioned after each other, i.e. separated along the length of the radiating component. The separation may be a predetermined tuned distance. Generally, there should be a sufficient number of actuators along the circumference of the cross section to react to the expected vibrational mode or modes.

Figure 5E:
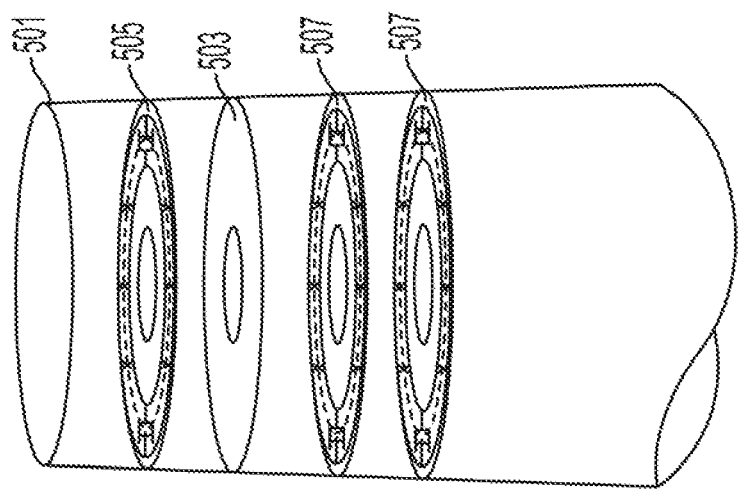
FIG. 5E shows an example of a combination of modification features arranged within a tower.
Figure 5D:
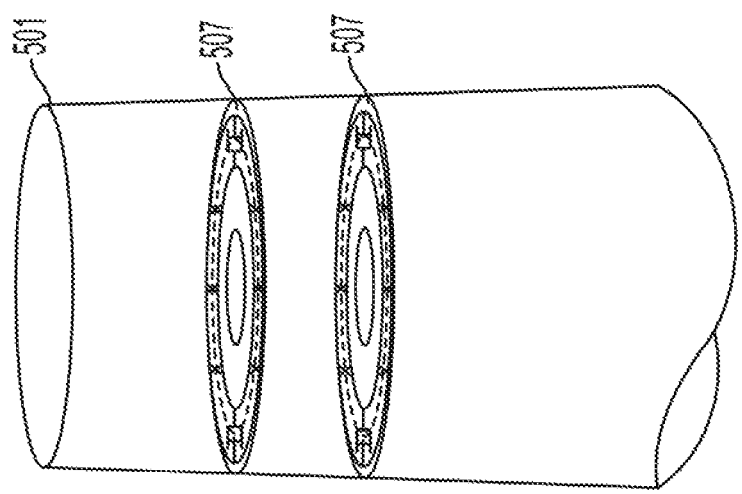
FIG. 5D shows an example of a portion of a turbine tower having ring mode exciter elements distributed along the length of the tower.

FIG. 5D shows an example of a portion of a turbine tower 501 having two ring mode exciter elements 507 distributed along the length of the tower.

Again the ring mode exciter aspect can be combined with the before mentioned damping and/or stiffening solutions.

For example, one or more damping elements may be employed as a resonance damping solution, with the remaining lower vibration level finally being cancelled by use of actuator rings.

FIG. 5E shows an example of a combination of all three types of modification features. A damping portion 505 is arranged between the interface of the tower 501 and the rest of the turbine and a stiffening portion 503. Further along the length of the tower two actuator based damping elements 507 are located next to each other in the manner described above.

Another feature that may be employed to reduce tonal noise, on its own or in combination with one or more of the above described features, is to provide an acoustic shield around parts or the radiating structure, An outer layer of material is positioned on the radiating component, the material being selected and mounted in such a way that its outer surface radiates less noise than that of the original structural configuration. The material properties are two-fold, it should both dissipate the out-coming acoustic waves from the shielded structure and also its own surface vibration should couple weakly to acoustic pressure out in the far field, One manner to achieve this is to form the acoustic shield from a combination of an inner porous material and an outer layer of material having a flexural wavelength shorter than the acoustic wavelength within the tonal noise frequency band(s) of interest. The acoustic shield may be positioned at locations that emit tonal noise at significant volumes, determined as described above.

Figure 6:
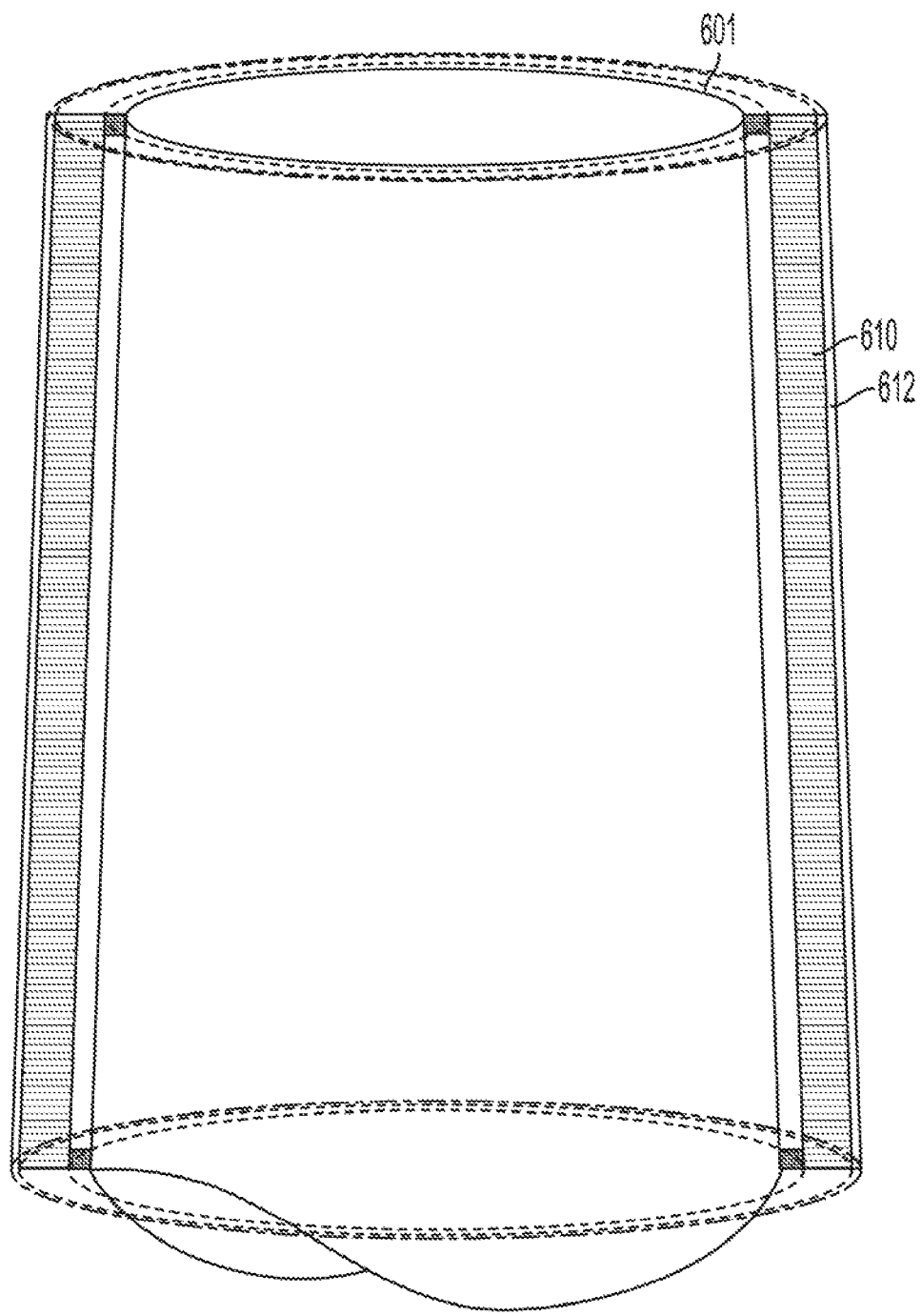
FIG. 6 shows an example of a tower portion that has had an acoustic shield applied to it.

FIG. 6 shows an example of a tower portion 601 that has had an acoustic shield applied to it. The acoustic shield is formed of an absorbing inner layer 610 and a low radiation, weakly acoustic coupling, cover or shield 612.

The above examples have focused on modifying the radiating component of the wind turbine (e.g. the tower or blades) to reduce tonal noise. It is, however, possible to modify and optimise all or a part of the vibration/noise transfer path from the vibrational source to the radiating element. Therefore, as an alternative to, or in addition to, modifying the radiating component, any other components within the transfer path may be modified.

The interface between these radiating components and the rest of the turbine may itself be modified. In particular, this may include modifying an interface component between the radiating component and the vibrational source. An interface component includes a component forming the interface with the radiating component and a component adjacent to the interface. The blades interface with the hub, and an interface component may include the pitch mechanism. The tower interfaces with the main frame, or nacelle. The tower interface component may include the yaw mechanism and/or the nacelle load bearing element, otherwise referred to as the base-plate, as this is a component that is known to transmit vibrations through to the tower. Therefore, the hub and the nacelle base-plate may be modified in accordance with the methods described herein.

The various components in the vibrational/noise transfer path may be modelled, in the manner described herein, by discretizing a modelled structure into a number of elements connected through discrete nodal points, such as by finite element analysis. The path of vibrations through the structure may be used to determine the transfer function applied to the radiating elements. The model of the one or more additional components in the transfer path, beyond the radiating elements, may therefore be considered as part of the transfer function, or the transfer function may be determined based upon such a model. Modifications to these components may be made, and a corresponding modification made to the transfer function to determine the impact of the change on the emission of tonal noise. The modifications may include adding stiffening, damping or mass in accordance with the techniques described herein or generally understood, in order to reduce the transmission of vibrations through the component under consideration.

The radiating components have generally been described in the context of a turbine tower or blade. Whilst these components could be the primary source of tonal noise, other components of the turbine may radiate tonal noise. A further example is the turbine nacelle enclosure. The turbine nacelle enclosure could equally be modelled, as appropriate, in the manner described herein.

The invention has been exemplified above with reference to specific examples of noise reducing means. The above modification features are examples only. Other designs/combinations are possible, such as using beams (e.g. vertical beams), angular elements and so on as the stiffeners/dampers. It should be emphasized that by the term "beam" is to be understood any kind of girder, balk, joist, bar or pipe with any kind of open profile such as I, H, L, C or Z profile or any kind of closed profile such as square, rectangular, polygonal or round profile or any combination thereof.

Any embodiments may be implemented as one or more computer programs executing on one or more processors. The method may be automated and provide as an output modified designs, or indications for modified designs, based upon appropriate input data. The method may further involve making the modifications determined to wind turbines during construction or in the field.

While embodiments of the invention have been shown and described, it will be understood that such embodiments are described by way of example only and it will be appreciated that features of different embodiments may be combined with one another. Numerous variations, changes and substitutions will occur to those skilled in the art without departing from the scope of the present invention as defined by the appended claims. Accordingly, it is intended that the following claims cover all such variations or equivalents as fall within the spirit and the scope of the invention.

The invention claimed is:

1. A method for determining a wind turbine component design, the method comprising:

modelling a radiating component of the wind turbine as a plurality of elements, wherein each element represents a physical portion of the radiating component of the wind turbine and at least a portion of each of the elements are acoustically coupled to one or more of the other elements;

applying, at an interface of the modelled radiating component, a simulation of a vibrational source located within the wind turbine;

using a transfer function to determine the transmission of vibrations from the interface with the vibrational source to the elements;

determining tonal noise radiated from the plurality of elements to an environment external to the wind turbine based upon the transmission of vibrations from the interface through the elements; and modifying the design of the radiating component of the wind turbine, or of a component between the radiating component and the vibrational source, to reduce the tonal noise radiated from the radiating component.

2. The method of claim 1 wherein determining the tonal noise radiated from the plurality of elements to an environment external to the wind turbine comprises determining the vibrations transmitted to elements located at an interface between the radiating component and the environment external to the wind turbine.

3. The method of claim 1 further comprising:
applying a filter to the elements;
wherein the filter identifies a group of the elements that do not substantially acoustically couple, directly or indirectly, with elements that are located at the interface between the radiating component and the environment external to the wind turbine, and
removing said group of elements from the determining the tonal noise radiated to the environment external to the wind turbine.

4. The method of claim 1, further comprising determining a vibrational transfer path through the elements taken by vibrations having a frequency that corresponds to tonal noise during transfer of the vibrations from the source interface to the plurality of elements.

5. The method of claim 4, further comprising using the vibrational transfer path to identify a position in the vibrational transfer path where one or more properties of the wind turbine radiating component may be modified to reduce the vibrational transfer from the source interface to the plurality of elements that are located at an interface between the radiating component and the environment external to the wind turbine, the position being determined based upon the position of elements in the vibrational transfer path.

6. The method of claim 5, further comprising outputting an indication of the position where the radiating component may be modified.

7. The method of claim 1 further comprising modifying the design of the radiating component by doing at least one of:
changing the thickness of a portion of the radiating component;
adding a mechanical stiffener to the radiating component;
adding a vibrational dampener to the radiating component; or
adding an acoustic shield to the radiating component.

8. The method of claim 7 wherein:
the vibrational dampener is positioned between two mechanical stiffeners, or between a mechanical stiffener and the interface with the vibrational source.

9. The method of claim 7 wherein:
the vibrational dampener comprises a plurality of damping elements placed between an outer structure and an inner structure, the damping elements connecting the outer structure and inner structure together.

10. The method of claim 9 wherein:
the damping elements are comprised of a resilient material; or
the damping elements are actuators configured to be driven at a desired frequency.

11. The method of claim 1, wherein the characteristics of the simulation of the vibrational source are predetermined, the characteristics including frequency and amplitude of vibrations of the vibrational source.

12. The method of claim 1 wherein the radiating component is the wind turbine tower.

13. The method of claim 12 wherein the interface of the modelled radiating component with the vibrational source is the interface between the tower and the nacelle base-plate.

14. The method of claim 1 wherein the radiating component is a blade of the wind turbine.

15. The method of claim 14 wherein the interface of the modelled radiating component with the vibrational source is the interface between the hub and the blade root.

16. The method of claim 1 wherein the vibrational source is the drivetrain of the wind turbine.

17. The method of claim 1 wherein the modification to the design is made at or near a position corresponding to an anti-node of a mode of vibration of the radiating component that is determined to couple with the transmitted vibrations.

18. The method of claim 1, further comprising automatically modifying the design of the radiating component of the wind turbine, or of a component between the radiating component and the vibrational source, by selecting one or more modifications to said component from a predetermined database of solutions, repeating the method of any preceding claim and applying an optimization algorithm to determine a solution that meets a predetermined criteria for emission of tonal noise.

19. A method of determining tonal noise radiation of a wind turbine, comprising:
modelling a radiating component of the wind turbine as a plurality of elements, wherein each element represents a physical portion of the radiating component of the wind turbine and at least a portion of each of the elements are acoustically coupled to one or more of the other elements;
applying, at an interface of the modelled radiating component, a simulation of a vibrational source located within the wind turbine;
using a transfer function to determine the transmission of vibrations from the interface with the vibrational source to the elements; and
determining tonal noise radiated from the plurality of elements to an environment external to the wind turbine based upon the transmission of vibrations from the interface through the elements.

20. The method of claim 19, wherein the operation further comprises modifying the design of the radiating component of the wind turbine, or of a component between the radiating component and the vibrational source, to reduce the tonal noise radiated from the radiating component.

21. A computer readable medium containing a program which, when executed by one or more processors, performs an operation of determining tonal noise radiation of a wind turbine, the operation comprising:
modelling a radiating component of the wind turbine as a plurality of elements, wherein each element represents a physical portion of the radiating component of the wind turbine and at least a portion of each of the elements are acoustically coupled to one or more of the other elements;
applying, at an interface of the modelled radiating component, a simulation of a vibrational source located within the wind turbine;
using a transfer function to determine the transmission of vibrations from the interface with the vibrational source to the elements; and
determining tonal noise radiated from the plurality of elements to an environment external to the wind turbine based upon the transmission of vibrations from the interface through the elements.

22. The computer readable medium of claim 21, wherein the operation further comprises modifying the design of the radiating component of the wind turbine, or of a component between the radiating component and the vibrational source, to reduce the tonal noise radiated from the radiating component.

* * * * *